US011155660B2

United States Patent
Heo et al.

(10) Patent No.: US 11,155,660 B2
(45) Date of Patent: Oct. 26, 2021

(54) METHOD FOR PREPARING COPOLYMER AND COPOLYMER

(71) Applicant: LG CHEM, LTD., Seoul (KR)

(72) Inventors: Jae Won Heo, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/627,240

(22) PCT Filed: Oct. 1, 2018

(86) PCT No.: PCT/KR2018/011639
§ 371 (c)(1),
(2) Date: Dec. 27, 2019

(87) PCT Pub. No.: WO2019/066616
PCT Pub. Date: Apr. 4, 2019

(65) Prior Publication Data
US 2020/0181301 A1    Jun. 11, 2020

(30) Foreign Application Priority Data

Sep. 29, 2017 (KR) .......................... 10-2017-0127975
Sep. 28, 2018 (KR) .......................... 10-2018-0116461

(51) Int. Cl.
*C08F 212/10* (2006.01)
*C08F 220/44* (2006.01)
(Continued)

(52) U.S. Cl.
CPC .............. *C08F 212/10* (2013.01); *C08F 2/18* (2013.01); *C08F 2/38* (2013.01); *C08F 279/04* (2013.01);
(Continued)

(58) Field of Classification Search
None
See application file for complete search history.

(56) References Cited

U.S. PATENT DOCUMENTS

2013/0337161 A1* 12/2013 Akimoto .................. C08J 7/046
427/162

FOREIGN PATENT DOCUMENTS

| CN | 103551134 | 2/2014 |
| CN | 103990384 | 8/2014 |

(Continued)

OTHER PUBLICATIONS

Liu, C. et al. "Grafting polystyrene onto silica nanoparticles via RAFT polymerization". Polymer 2007, 48, 3679-3685. (Year: 2007).*

(Continued)

*Primary Examiner* — Richard A Huhn

(57) ABSTRACT

The present invention relates to a method for preparing a copolymer, comprising adding a surface-modified silica nanopowder, a vinyl cyan-based monomer, and an aromatic vinyl-based monomer and polymerizing the same, wherein the surface-modified silica nanopowder is a silica nanopowder which are surface-modified with a chain transfer agent for reversible addition-fragmentation chain transfer polymerization; a copolymer prepared according to the method; and a thermoplastic resin-molded article manufactured using the copolymer. More particularly, the present invention relates to a method for preparing a copolymer having improved heat shrinkage and reflection haze; a copolymer; and a thermoplastic resin-molded article.

11 Claims, 1 Drawing Sheet

(51) Int. Cl.
    C08F 292/00    (2006.01)
    C08F 2/18       (2006.01)
    C08K 3/36       (2006.01)
    C08F 2/38       (2006.01)
    C08F 279/04    (2006.01)
    C08K 9/04       (2006.01)

(52) U.S. Cl.
    CPC .............. C08F 292/00 (2013.01); C08K 3/36 (2013.01); C08K 9/04 (2013.01); *C08F 220/44* (2013.01); *C08F 2438/03* (2013.01); *C08K 2201/003* (2013.01); *C08K 2201/011* (2013.01)

(56) References Cited

FOREIGN PATENT DOCUMENTS

| | | |
|---|---|---|
| JP | 2800314 | 9/1998 |
| JP | 2000264926 | 9/2000 |
| JP | 2006056999 | 3/2006 |
| JP | 2008163249 | 7/2008 |
| KR | 100694474 | 3/2007 |
| KR | 100738580 | 7/2007 |
| KR | 20130001204 | 1/2013 |
| KR | 101677515 B1 | 11/2016 |

OTHER PUBLICATIONS

Ullmann's Encyclopedia of Industrial Chemistry. "Polystyrene and Styrene Copolymers". 2012. (Year: 2012).*

Li, C. et al. "Synthesis of Well-Defined Polymer Brushes Grafted onto Silica Nanoparticles via Surface Reversible Addition-Fragmentation Chain Transfer Polymerization". Macromolecules 2005, 38(14), 5929-5936. (Year: 2005).*

Perrier, S. "50th Anniversary Perspective: RAFT Polymerization-A User Guide". Macromolecules 2017, 50, 7433-7447. (Year: 2017).*

Browning, R. et al. "Effects of Acrylonitrile Content and Molecular Weight on the Scratch Behavior of Styrene-Acrylonitrile Random Copolymers". Polym. Eng. Sci. 2011, 51(11), 2282-2294. (Year: 2011).*

Ohno, K. et al. "Surface-Initiated Reversible Addition-Fragmentation Chain Transfer (RAFT) Polymerization from Fine Particles Functionalized with Trithiocarbonates". Macromolecules 2011, 44, 8944-8953. (Year: 2011).*

Moraes, J. et al. "Synthesis of silica-polymer core-shell nanoparticles by reversible addition-fragmentation chain transfer polymerization". Chemical Communications 2013, 49(80), 9077-9088. (Year: 2013).*

Matsumoto, et al., "Hybridization of Surface-modified metal nanoparticles and a resin" Journal of Nanoparticle Research, Nov. 2004.

International Search Report dated Jan. 10, 2019 in related PCT/KR2018/011639.

Shanmugharaj, et al., "Synthesis of Poly (Styrene-co-acrylonitrile) copolymer brushes on silica nanoparticles through surface-initiated polymerization" Department of Chemical Engineering, College of Engineering, Kyung Hee University, South Korea, Jan. 2013.

Khalifa, "Synthesis of Polymer Grafted Silica Nanoparticles: Effect of Grafting on Mechanical Reinforcement" Heriot-Watt University, School of Engineering and Physical Sciences, Institute of Chemical Sciences, Aug. 2013.

Extended European Search Report for EP18861557, dated Nov. 30, 2020.

Sobani Masoud et al., "'Grafting through' approach for synthesis of polystyrene/silica aerogel nanocomposites by in situ reversible addition-fragmentation chain transfer polymerization', Journal of SOL-GEL Science and Technology, Springer, New York, NY, US, vol. 66, No. 2, Mar. 21, 2013, pp. 337-344.

Bindushree Radhakrishnan et al., "Surface initiated polymerizations from silica nanoparticles", Soft Matter, vol. 2, No. 5, Jan. 1, 2006, pp. 386-396.

Youke Huang et al., "Synthesis of Silica Particles Grafted with Well-Defined Living Polymeric Chains by Combination of RAFT Polymerization and Coupling Reaction", Macromolecules, vol. 42, No. 15, Aug. 11, 2009, pp. 5509-5517.

* cited by examiner

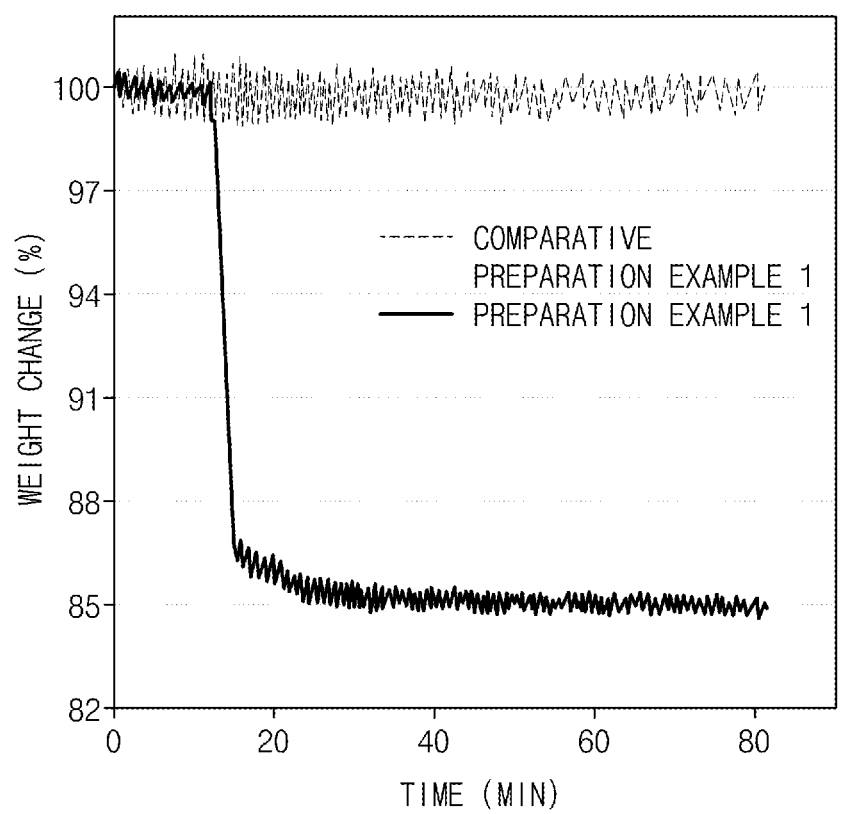

METHOD FOR PREPARING COPOLYMER AND COPOLYMER

CROSS-REFERENCE TO RELATED APPLICATIONS

The present application is a National Phase of International Application No. PCT/KR2018/011639, filed Jan. 10, 2018 which claims the priority benefit of Korean Patent Application No. 10-2017-0127975, filed on Sep. 29, 2017, and Korean Patent Application No. 10-2018-0116461, filed on Sep. 28, 2018, in the Korean Intellectual Property Office, the disclosure of each of which is incorporated herein by reference.

TECHNICAL FIELD

Technical Field

The present invention relates to a copolymer and a method for preparing the same, and more particularly, to a copolymer having improved heat shrinkage and reflection haze and a method for preparing the same.

BACKGROUND ART

An SAN copolymer prepared by polymerizing styrene and acrylonitrile has excellent processability and heat resistance, and thus demand therefor is increasing. An SAN copolymer is mainly used in household appliances, automobiles, packaging, buildings, medical machines, etc. In addition, an SAN copolymer is used as a matrix copolymer for an ABS graft copolymer to prepare a thermoplastic resin composition. An SAN copolymer has excellent fluidity and serves to shorten a molding cycle upon molding, thereby providing high productivity and economic efficiency.

An SAN copolymer may be manufactured into an article by mixing with an ABS graft copolymer and injection-molding at high temperature under high pressure, followed by cooling at room temperature under atmospheric pressure. However, the entire volume may be excessively shrunk in a process of producing an article using the SAN copolymer, whereby the appearance of the article may be deformed and warped (distorted), and thus, dimensional stability may be reduced. Therefore, research into improving the heat shrinkage problem of a styrene-acrylonitrile copolymer to increase the dimensional stability of a final product has been continued.

DISCLOSURE

Technical Problem

The present invention is directed to providing a method for preparing a copolymer having improved heat shrinkage and reflection haze.

Technical Solution

In accordance with an aspect of the present invention, there is provided a method for preparing a copolymer, compring suspension-polymerizing a surface-modified silica nanopowder, a vinyl cyan-based monomer, and an aromatic vinyl-based monomer, wherein the surface-modified silica nanopowder is a silica nanopowder which are surface-modified with a chain transfer agent for reversible addition-fragmentation chain transfer polymerization.

In accordance with another aspect of the present invention, there is provided a copolymer comprising a silica nanopowder; a sulfur compound-derived unit; a vinyl cyan-based monomer-derived unit; and an aromatic vinyl-based monomer-derived unit.

Advantageous Effects

By using a method for preparing a copolymer according to the present invention, a vinyl cyan-based monomer and an aromatic vinyl-based monomer can be easily graft-polymerized to a surface of the surface-modified silica nanopowder, whereby the surface-modified silica nanopowder can be more uniformly distributed in a copolymer, and bonding forces between the surface-modified silica nanopowder and an aromatic vinyl monomer-derived unit and between the surface-modified silica nanopowder and a vinyl cyan-based monomer-derived unit can be remarkably improved.

In addition, due to such structural features, an increase in reflection haze of a copolymer, i.e., deterioration of appearance characteristics, due to a silica nanopowder can be prevented.

Further, a surface-modified silica nanopowder can be increased graft polymerization efficiency, whereby dispersibility of the silica nanopowder can be remarkably increased and dimensional stability of a thermoplastic resin-molded article can be remarkably improved.

DESCRIPTION OF DRAWINGS

FIG. 1 illustrates thermogravimetric analysis (TGA) results of a silica nanopowder of Preparation Example 1 and a silica nanopowder of Comparative Preparation Example 1.

BEST MODE FOR CARRYING OUT THE INVENTION

Hereinafter, the present invention will be described to facilitate understanding of the present invention Terms or words used in the specification and the following claims shall not be limited to common or dictionary meanings, and have meanings and concepts corresponding to technical aspects of the embodiments of the present invention so as to most suitably express the embodiments of the present invention.

In the present invention, an average particle diameter of a silica nanopowder may be measured using NICOMP 370 HPL, as a product name, (manufacturer: NICOMP) after dispersing a silicon nanopowder to a concentration of 0.1% by weight in methanol and performing sonication with a sonicator (manufacturer: Malik Scientific Glass Works) for one hour.

In the present invention, a weight average molecular weight of a copolymer may be measured as a relative value relative to a standard polystyrene (PS) sample using tetrahydrofuran (THF), as an eluate, and gel permeation chromatography (GPC, Waters Breeze).

In the present invention, the coefficient of thermal expansion (ppm/K) of a film may be measured using thermomechanical analysis (TMA) equipment (manufacturer: TA Instruments, product name: Q400 TMA). A change in a film length may be measured at room temperature (25° C.) up to 90° C., and a CTE value may be calculated according to the following equation. It is preferred to use a value of a second cycle to increase reliability of data.

$$CTE(ppm/K) = \frac{\Delta L}{L_0} \frac{1}{\Delta T} \times 1,000,000$$

ΔL=(Film length increased at 90° C.)−(Film length at room temperature)
Lo=Film length at room temperature
ΔT=Changed temperature In the present invention, reflection haze may be measured using 512 diodes, arranged in a straight line, profiling reflected light of 14 to 27 degrees in a large arc by means of a Rhopoint IQ apparatus, as a product name, (manufacturer: Rhopoint Instruments). Here, a smaller reflection haze indicates superior appearance characteristics.

1. Copolymer Preparation Method

A method for preparing a copolymer according to an embodiment of the present invention comprises adding a surface-modified silica nanopowder, a vinyl cyan-based monomer, and an aromatic vinyl-based monomer and polymerizing the same. The surface-modified silica nanopowder is a silica nanopowder which is surface-modified with a chain transfer agent for reversible addition-fragmentation chain transfer (RAFT) polymerization.

The chain transfer agent for RAFT polymerization may be a sulfur compound. The sulfur compound may be one or more selected from the group consisting of 4-cyano-4-(phenylcarbonothioylthio)pentanoic acid, 4-cyano-4-[(dodecylsulfanylthiocarbonyl)sulfanyl]pentanoic acid, and 2-(dodecylthiocarbonothioylthio)-2-methylpropionic acid. Thereamong, 4-cyano-4-(phenylcarbonothioylthio)pentanoic acid is preferred.

Since a vinyl cyan-based monomer and an aromatic vinyl-based monomer can be easily graft-polymerized to a surface of the surface-modified silica nanopowder due to a functional group, derived from a sulfur compound, of the surface-modified silica nanopowder, the surface-modified silica nanopowder can be uniformly distributed in a copolymer, bonding forces between the surface-modified silica nanopowder and an aromatic vinyl monomer-derived unit and between the surface-modified silica nanopowder and a vinyl cyan-based monomer-derived unit may be remarkably improved.

Due to such a structural feature, the surface-modified silica nanopowder may be uniformly distributed in a copolymer. Accordingly, an increase in reflection haze, i.e., deterioration of appearance characteristics, due to a silica nanopowder, may be prevented.

Meanwhile, the surface-modified silica nanopowder exhibits remarkably excellent thermal stability, compared to a silica nanopowder that is not surface-modified. Accordingly, a copolymer including the surface-modified silica nanopowder also exhibits remarkably improved heat shrinkage, and a thermoplastic resin-molded article manufactured using the copolymer may exhibit improved dimensional stability.

Meanwhile, the silica nanopowder may further include a hydroxyl group. More particularly, the silica nanopowder may be a hydrophilic fumed silica nanopowder including a hydroxyl group present on a surface thereof.

The surface-modified silica nanopowder may be prepared by reacting the silica nanopowder with a sulfur compound, more particularly by esterifying a hydroxyl group present on a surface of the hydrophilic fumed silica nanopowder with a sulfur compound.

Accordingly, the surface-modified silica nanopowder may include an unreacted hydroxyl group present on a surface thereof.

The surface-modified silica nanopowder may be reacted with a sulfur compound in a molar ratio of 1:500 to 1:2,000, 1:700 to 1:1,500, or 1:800 to 1:1,000. Thereamong, a molar ratio of 1:800 to 1:1,000 is preferred.

Within these ranges, the efficiency of esterification may be maximized while minimizing a residual amount of the sulfur compound.

Meanwhile, the hydrophilic fumed silica may be prepared according to Reaction Scheme 1 below:

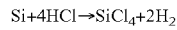

 [Reaction Scheme 1]

Referring to Reaction Scheme 1, first, silicon is reacted with hydrogen chloride to generate a chlorosilane. This chlorosilane is hydrolyzed in a flame of 1,000° C. or more formed with oxygen and hydrogen, thereby generating hydrophilic fumed silica including a hydroxyl group present on a surface thereof, i.e., silicon dioxide including a hydroxyl group present on a surface thereof.

Base particles (primary particles) of the hydrophilic fumed silica generated from the flame in this manner collide with each other in a state wherein a surface of the hydrophilic fumed silica is dissolved, thereby being formed into secondary particles. A hydrogen chloride gas remaining in silicon dioxide is removed under a high-temperature air condition, and an average particle diameter and specific surface area of the silicon dioxide may be adjusted by changing the composition of reactants and the temperature of the flame. The hydrophilic fumed silica may be amorphous silica.

The hydrophilic fumed silica may be prepared by the aforementioned method, or a commercially available hydrophilic fumed silica may be used.

In addition, the silica nanopowder may have an average particle diameter of 100 nm or less, 1 to 100 nm, or 5 to 50 nm. Thereamong, an average particle diameter of 5 to 50 nm is preferred.

Within these ranges, a silica nanopowder may be uniformly dispersed in a reaction solution, and thus, may be more uniformly distributed in a copolymer. As a result, a reflection haze increase, i.e., deterioration of appearance characteristics, due to the silica nanopowder may be prevented.

The surface-modified silica nanopowder may be added in an amount of 0.01 to 2.0 parts by weight, 0.01 to 1.5 parts by weight, or 0.1 to 1.0 part by weight based on 100 parts by weight of the sum of the vinyl cyan-based monomer and the aromatic vinyl-based monomer. Thereamong, an amount of 0.1 to 1.0 part by weight is preferred.

Within these ranges, a vinyl cyan-based monomer and an aromatic vinyl-based monomer may be easily graft-polymerized to a surface of the surface-modified silica nanopowder, whereby the surface-modified silica nanopowder may be more uniformly distributed in a copolymer, and bonding forces between the surface-modified silica nanopowder and an aromatic vinyl monomer-derived unit and between the surface-modified silica nanopowder and a vinyl cyan-based monomer-derived unit may be remarkably improved. In addition, excellent impact resistance and surface gloss may be realized due to the silica nanopowder while inhibiting a reflection haze increase, i.e., deterioration of appearance characteristics, and heat shrinkage of a copolymer may also be remarkably improved.

Meanwhile, the coefficient of thermal expansion, as a numerical value, is a rate of expansion by heat under a predetermined pressure per unit temperature, and expansion and contraction ratios are intrinsic properties of an object. In addition, thermal contraction and expansion of a copolymer occur due to a density difference thereof dependent upon temperature. For example, since the coefficient of thermal expansion of the surface-modified silica nanopowder of the present invention is low although the coefficient of thermal expansion of a copolymer including a styrene-derived unit and an acrylonitrile-derived unit is $50 \times 10^{-6}$ to $150 \times 10^{-6}$ $K^{-1}$ (based on thickness: 1 to 2 μm), the coefficient of thermal expansion of a copolymer may be improved when the surface-modified silica nanopowder of the present invention is included in the copolymer. Accordingly, in the case of a thermoplastic resin composition including a conjugated diene-based polymer, a graft copolymer including a vinyl cyan-based monomer-derived unit and a vinyl cyan-based monomer; and a matrix copolymer including a vinyl cyan-based monomer-derived unit and an aromatic vinyl-based monomer-derived unit, problems occurring during molding at room temperature under atmospheric pressure after injection-molding at high temperature under high pressure may be reduced. More particularly, in the case of a thermoplastic resin composition, the energy of chain molecules in a copolymer is reduced in a molding process, and thus, distances between the chain molecules are reduced. Accordingly, the density of a resin composition may increase, and the entire volume of the thermoplastic resin composition may be contracted. On the other hand, when the surface-modified silica nanopowder is included in a matrix copolymer, reduction of distances between chain molecules in a thermoplastic resin may be prevented, whereby deformation and warping of an appearance of a thermoplastic resin-molded article may be reduced and dimensional stability thereof may be improved.

The vinyl cyan-based monomer may be one or more selected from the group consisting of acrylonitrile, methacrylonitrile, ethacrylonitrile, phenylacrylonitrile, chloroacrylonitrile, and α-(cyanoethyl)-acrylonitrile. Thereamong, acrylonitrile is preferred.

The aromatic vinyl-based monomer may be one or more selected from the group consisting of styrene, α-methylstyrene, p-bromostyrene, p-methylstyrene, p-chlorostyrene, and o-bromostyrene. Thereamong, styrene is preferred.

The vinyl cyan-based and the aromatic vinyl-based monomer may be added in a weight ratio of 15:85 to 35:65 or 20:80 to 30:70, particularly a weight ratio of 20:80 to 30:70.

Within these ranges, a copolymer having excellent processability, heat resistance, and chemical resistance may be prepared.

Meanwhile, the polymerization may be suspension polymerization.

The polymerization step may be a step of adding a surface-modified silica nanopowder, a vinyl cyan-based monomer, an aromatic vinyl-based monomer, an initiator, and a suspension stabilizer to water and stirring the same, followed by performing polymerization at 70 to 90° C.

The initiator may be one or more selected from the group consisting of a water-soluble polymerization initiator, a fat-soluble polymerization initiator, and an oxidation-reduction catalyst. Thereamong, a fat-soluble polymerization initiator is preferred.

The water-soluble polymerization initiator may be one or more selected from the group consisting of potassium persulfate, sodium persulfate and ammonium persulfate.

The fat-soluble polymerization initiator may be one or more selected from the group consisting of cumene hydroperoxide, diisopropyl benzene hydroperoxide, azobis(isobutyronitrile), t-butyl hydroperoxide, para-menthane hydroperoxide, and benzoylperoxide. Thereamong, azobis (isobutyronitrile) is preferred.

The oxidation-reduction catalyst may include one or more selected from the group consisting of sodium formaldehyde, a sulfoxylate, sodium ethylene diaminotetraacetate, ferrous sulfate, dextrose, sodium sulfite, potassium pyrophosphate, sodium pyrophosphate, potassium phosphate, sodium phosphate, potassium hydrogen phosphate, and sodium hydrogen phosphate. In particular, the oxidation-reduction catalyst may include one or more selected from the group consisting of ferrous sulfate, dextrose, and sodium pyrophosphate.

The content of the initiator is not specifically limited and may be 0.1 to 2.0 parts by weight, 0.1 to 1.5 parts by weight, or 0.1 to 1 part by weight based on 100 parts by weight of the sum of the vinyl cyan-based monomer and the aromatic vinyl-based monomer.

Within these ranges, a polymerization conversion rate of monomers in the same time may increase. In addition, radicals for initiating polymerization may be sufficiently generated, and polymerization may be easily performed.

The suspension stabilizer may be one or more selected from the group consisting of water-soluble polyvinyl alcohol, oil-soluble partially saponified polyvinyl alcohol, polyacrylic acid, a copolymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, dodecylbenzene sulfonic acid sodium salt, and sodium dioctylsulfosuccinate. Thereamong, tricalcium phosphate is preferred.

The suspension stabilizer may be added in an amount of 0.01 to 2 parts by weight, 0.05 to 1.5 parts by weight, or 0.1 to 1 part by weight based on 100 parts by weight of the sum of the vinyl cyan-based monomer and the aromatic vinyl-based monomer. Thereamong, an amount of 0.1 to 1 part by weight is preferred.

Within these ranges, high polymerization stability is exhibited, and deterioration in properties of a copolymer due to the suspension stabilizer may be prevented.

In the polymerization step, a molecular weight regulator may be further added.

The molecular weight regulator may be one or more selected from the group consisting of an α-methylstyrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropylxantogen disulfide. Thereamong, t-dodecyl mercaptan is preferred.

The molecular weight regulator may be added in an amount of 0.1 to 1.0 part by weight, 0.1 to 0.8 part by weight, or 0.1 to 0.5 part by weight based on 100 parts by weight of the sum of the vinyl cyan-based monomer and the aromatic vinyl-based monomer.

Within these ranges, a copolymer having an appropriate weight average molecular weight may be prepared.

A surface-modified silica nanopowder having excellent thermal stability may be uniformly distributed in a copolymer prepared according to an embodiment of the present invention, and bonding forces between the surface-modified silica nanopowder and the vinyl cyan-based monomer-derived unit and between the surface-modified silica nanopowder and the aromatic vinyl-based monomer-derived unit are excellent. Due to such structural features, the copolymer may exhibit excellent heat shrinkage and reduced reflection haze.

A graft rate of the copolymer may be 20 to 90%, 40 to 90%, or 50 to 90%. Thereamong, a graft rate of 50 to 90% is preferred.

Within these ranges, graft polymerization using the surface-modified silica nanopowder may be easily performed, whereby the surface-modified silica nanopowder may be easily dispersed and dimensional stability thereof may be efficiently improved.

The graft rate may be calculated using solubility of the copolymer in an organic solvent such as acetone. More particularly, since a copolymer, grafted to a surface of a silica nanopowder, among the copolymer is not dissolved in acetone, a rate of a grafted copolymer may be calculated from a rate of a copolymer not adsorbed to the silica nanopowder surface.

2. Copolymer

A copolymer according to another embodiment of the present invention may include a silica nanopowder, a sulfur compound-derived unit, a vinyl cyan-based monomer-derived unit, and an aromatic vinyl-based monomer-derived unit.

The silica nanopowder and the sulfur compound-derived unit are derived from a surface-modified silica nanopowder. The sulfur compound may be derived from one or more sulfur compounds selected from the group consisting of 4-cyano-4-(phenylcarbonothioylthio)pentanoic acid, 4-cyano-4-[(dodecylsulfanylthiocarbonyl)sulfanyl]pentanoic acid, and 2-(dodecylthiocarbonothioylthio)-2-methylpropionic acid as chain transfer agents for reversible addition-fragmentation chain transfer polymerization.

The copolymer may have a weight average molecular weight of 100,000 to 150,000 g/mol, 105,000 to 140,000 g/mol, or 110,000 to 130,000 g/mol. Thereamong, a weight average molecular weight of 110,000 to 130,000 g/mol is preferred.

Within these ranges, the copolymer may exhibit excellent mechanical properties and fluidity.

In addition, the copolymer may have a glass transition temperature of 90° C. or more, 90 to 130° C., 95 to 125° C., or 100 to 120° C. Thereamong, a glass transition temperature of 100 to 120° C. is preferred.

Within these ranges, the copolymer may exhibit excellent heat resistance and improved process efficiency during injection-molding.

Other descriptions of the copolymer are the same as those described in "1. Copolymer preparation method," and the copolymer according to another embodiment of the present invention may be prepared according to the graft copolymer preparation method according to an embodiment of the present invention.

3. Thermoplastic Resin Composition

The thermoplastic resin composition according to still another embodiment of the present invention includes the copolymer according to another embodiment of the present invention; a matrix copolymer including an aromatic vinyl-based monomer-derived unit and a vinyl cyan-based monomer-derived unit; and a graft copolymer including a conjugated diene-based polymer, an aromatic vinyl-based monomer-derived unit, and a vinyl cyan-based monomer-derived unit.

The matrix copolymer may include an aromatic vinyl-based monomer-derived unit and a vinyl cyan-based monomer-derived unit. The aromatic vinyl-based monomer-derived unit and the vinyl cyan-based monomer-derived unit may be included in a weight ratio of 85:15 to 65:35 or 80:20 to 70:30. Thereamong, a weight ratio of 80:20 to 70:30 is preferred.

Within these ranges, a thermoplastic resin-molded article having excellent processability, chemical resistance and heat resistance may be manufactured.

The graft copolymer includes a conjugated diene-based polymer, an aromatic vinyl-based monomer-derived unit, and a vinyl cyan-based monomer-derived unit.

The conjugated diene-based polymer is prepared from a conjugated diene-based monomer. The conjugated diene-based monomer may be one or more selected from the group consisting of 1,3-butadiene, isoprene, chloroprene, and piperylene. Thereamong, 1,3-butadiene is preferred.

The conjugated diene-based polymer may have an average particle diameter of 50 to 500 nm, 50 to 400 nm, or 80 to 400 nm. Thereamong, an average particle diameter of 80 to 400 nm is preferred.

Within these ranges, the graft copolymer may exhibit excellent impact resistance and surface gloss.

The conjugated diene-based polymer may be included in an amount of 45 to 75% by weight or 50 to 70% by weight based on a total weight of the conjugated diene-based polymer, the aromatic vinyl-based monomer, and the vinyl cyan-based monomer. Thereamong, an amount of 50 to 70% by weight is preferred.

Within these ranges, the graft copolymer may exhibit improved impact resistance and processability.

The aromatic vinyl-based monomer may be added in an amount of 15 to 45% by weight or 20 to 40% by weight based on a total weight of the conjugated diene-based polymer, the aromatic vinyl-based monomer, and the vinyl cyan-based monomer. Thereamong, an amount of 20 to 40% by weight is preferred.

Within these ranges, the graft copolymer may exhibit further improved chemical resistance, stiffness, impact resistance, processability, and surface gloss.

The vinyl cyan-based monomer may be added in an amount of 1 to 20% by weight or 5 to 15% by weight based on a total weight of the conjugated diene-based polymer, the aromatic vinyl-based monomer, and the vinyl cyan-based monomer. Thereamong, an amount of 5 to 15% by weight is preferred.

Within these ranges, the graft copolymer may exhibit further improved chemical resistance, stiffness, impact resistance, processability, and surface gloss.

The thermoplastic resin composition may include 10 to 30% by weight of the copolymer; 45 to 65% by weight of the matrix copolymer; and 15 to 35% by weight of the graft copolymer, based on a total weight of the thermoplastic resin composition. Preferably, 15 to 25% by weight of the copolymer; 50 to 60% by weight of the matrix copolymer; and 20 to 30% by weight of the graft copolymer are included.

Within these ranges, the thermoplastic resin composition may exhibit excellent appearance characteristics, heat resistance, and processability.

4. Thermoplastic Resin-Molded Article

A thermoplastic resin-molded article manufactured using the thermoplastic resin composition according to still another embodiment of the present invention has a reflection haze of 2 or less, preferably a reflection haze of 1.95 or less.

Within these ranges, the thermoplastic resin-molded article may exhibit further improved appearance characteristics.

MODE FOR CARRYING OUT THE INVENTION

Now, exemplary embodiments of the present invention will be described in detail so that those skilled in the art can easily carry out the present invention. However, the present invention may be implemented in various different forms and is not limited to these embodiments.

Silica Nanopowder Preparation

Preparation Example 1

4.32 g (0.003 mmol) of hydrophilic fumed silica (manufacturer: Aeroil, average particle diameter: 12 nm) and 0.75 g (2.7 mmol) of 4-cyano-4-(phenylcarbonothioylthio)pentanoic acid were dissolved in 95 ml of toluene, and 1.3 g (6.3 mmol) of N,N'-dicyclohexylcarbodiimide and 0.31 g (2.5 mmol) of 4-dimethylaminopyridine were added thereto, followed by refluxing at 25° C. for 12 hours. After terminating the reaction, the reactant was filtered after slowly cooling at room temperature, thereby obtaining a surface-modified silica nanopowder including a reactive group derived from a sulfur compound.

Preparation Example 2

A surface-modified silica nanopowder was obtained in the same manner as in Preparation Example 1, except that hydrophilic fumed silica (manufacturer: Aeroil, average particle diameter: 50 nm) was used instead of hydrophilic fumed silica (manufacturer: Aeroil, average particle diameter: 12 nm).

Comparative Preparation Example 1

A hydrophilic fumed silica which was not surface-modified (manufacturer: Aeroil, average particle diameter: 12 nm) was used as Comparative Preparation Example 1.

Copolymer Preparation

Examples and Comparative Examples 140 parts by weight of ion-exchanged water, a silica nanopowder summarized in Table 1 below, 0.2 part by weight of azobis(isobutyronitrile) (AIBN) as an initiator, 25 parts by weight of acrylonitrile, 75 parts by weight of styrene, 0.5 part by weight of tricalcium phosphate as a suspension stabilizer, and 0.2 part by weight of t-dodecyl mercaptan as a molecular weight regulator were fed into a polymerization reactor, and suspension polymerization was performed at 72° C. for 6 hours, thereby preparing a styrene-acrylonitrile copolymer.

TABLE 1

| Classification | Type | Content (parts by weight) |
| --- | --- | --- |
| Example 1 | Preparation Example 1 | 0.01 |
| Example 2 | Preparation Example 1 | 0.1 |
| Example 3 | Preparation Example 1 | 0.5 |
| Example 4 | Preparation Example 2 | 0.1 |
| Example 5 | Preparation Example 2 | 0.3 |
| Comparative Example 1 | Comparative Preparation Example 1 | 0.01 |
| Comparative Example 2 | Comparative Preparation Example 1 | 0.1 |
| Comparative Example 3 | Comparative Preparation Example 1 | 0.5 |
| Comparative Example 4 | — | — |

Comparative Example 5

80 parts by weight of toluene, 0.01 part by weight of a silica nanopowder of Comparative Preparation Example 1, azobis(isobutyronitrile) (AIBN) as an initiator, 25 parts by weight of acrylonitrile, 75 parts by weight of styrene, 0.5 part by weight of tricalcium phosphate as a dispersant, and 0.2 part by weight of t-dodecyl mercaptan as a molecular weight regulator were fed into a polymerization reactor and the polymerization reactor was equipped with a refluxer to perform solution polymerization at 120° C. for 3 hours.

Experimental Example 1

The silica nanopowder of Preparation Example 1 and the silica nanopowder of Comparative Preparation Example 1 were allowed to stand at 350° C. for 80 minutes under a $N_2$ atmosphere to perform thermogravimetric analysis (TGA). A result is illustrated in FIG. 1.

Referring to FIG. 1, the silica nanopowder of Comparative Preparation Example 1 was not decomposed by heat, and thus, the weight thereof was not changed, whereas, in the case of the silica nanopowder of Preparation Example 1, an organic material was introduced into a surface thereof, whereby a weight reduction occurred as a certain time elapsed at high temperature. This result indicates that the silica nanopowder of Preparation Example 1 was satisfactorily surface-modified.

Experimental Example 2

The properties of the copolymers of the examples and comparative examples were measured according to the following methods. Results are summarized in Table 2 below.

1) Weight average molecular weight (g/mol): Measured as a relative value to a standard polystyrene (PS) sample by gel permeation chromatography (GPC, Waters Breeze) using tetrahydrofuran (THF) as an eluate.

2) Glass transition temperature (° C.): Measured using a differential scanning calorimeter (manufacturer: Ta Instruments, product name: DSC Q20).

Experimental Example 3

The copolymer of the examples and the comparative examples and an acrylic copolymer (product name: XT510, manufacturer: LG Chem Ltd.) were mixed in a weight ratio of 5:5, and then dissolved to a concentration of 2% by weight in N,N-dimethylacetamide, followed by evaporation of a solvent at 80° C. As a result, a specimen having a thickness of 1 μm was manufactured.

3) Coefficient of thermal expansion (CTE, ppm/K): The CTE of a specimen was measured using thermomechanical analysis (TMA) equipment (manufacturer: TA Instruments, product name: Q400 TMA). A change in a film length may be measured at room temperature (25° C.) up to 90° C., and a CTE value may be calculated according to the following equation. A value of a second cycle was used to increase reliability of data.

$$CTE(ppm/K) = \frac{\Delta L}{L_0} \frac{1}{\Delta T} \times 1,000,000$$

ΔL=(Film length increased at 90° C.)−(Film length at room temperature)
Lo=Film length at room temperature
ΔT=Changed temperature Experimental Example 4

20 parts by weight of the copolymer of the examples and the comparative examples, 27 parts by weight of a rubber-modified vinyl-based graft copolymer (product name: DP270, manufacturer: LG Chem Ltd.), and 53 parts by weight of an aromatic vinyl-cyanide vinyl-based resin (product name: 92HR, manufacturer: LG Chem Ltd.) were uniformly mixed, thereby preparing a thermoplastic resin composition. The thermoplastic resin composition was extruded and injection-molded at 200° C., thereby obtaining a specimen having a thickness of 1 μm. The reflection haze of the specimen was measured according to the following method. Results are summarized in Table 2 below.

4) Reflection haze: Measured using 512 diodes, arranged in a straight line, profiling reflected light of 14 to 27 degrees in a large arc by means of a Rhopoint IQ apparatus, as a product name, (manufacturer: Rhopoint Instruments). Here, a smaller reflection haze indicates superior appearance characteristics.

TABLE 2

| Classification | Weight average molecular weight (g/mol) | Glass transition temperature (° C.) | CTE (ppm · K$^{-1}$) | Reflection haze |
|---|---|---|---|---|
| Example 1 | 120,000 | 104 | 96 | 1.6 |
| Example 2 | 115,000 | 105 | 82 | 1.7 |
| Example 3 | 122,000 | 109 | 77 | 1.9 |
| Example 4 | 120,000 | 107 | 82 | 1.8 |
| Example 5 | 118,000 | 108 | 79 | 2.0 |
| Comparative Example 1 | 114,000 | 105 | 105 | 2.7 |
| Comparative Example 2 | 112,000 | 105 | 98 | 4.5 |
| Comparative Example 3 | 121,000 | 108 | 87 | 7.2 |
| Comparative Example 4 | 120,000 | 104 | 112 | 2.1 |
| Comparative Example 5 | 148,000 | 105 | 96 | 9.8 |

From Table 2, it can be confirmed that the copolymers of Examples 1 to 5 exhibit almost the same weight average molecular weight and glass transition temperature as those of the copolymers of Comparative Example 1 to 3. From these results, it can be confirmed that the surface-modified silica nanopowder does not negatively affect basic properties of the copolymer.

Meanwhile, it can be confirmed that, when comparing Example 2 with Example 4, reflection haze is low when the average particle diameter of the silica nanopowder is small. From this result, it can be confirmed that the average particle diameter of the silica nanopowder affects appearance quality.

When Example 1 is compared with Comparative Example 1, Example 2 is compared with Comparative Example 2, and Example 3 is compared with Comparative Example 3, it can be confirmed that the thermal expansion coefficients and reflection haze of the examples are remarkably lower than those of the comparative examples. From this result, it can be confirmed that surface modification of the silica nanopowder affects dimensional stability and appearance quality.

Meanwhile, it can be confirmed that, when Comparative Example 5 is compared with Example 1 and Comparative Example 1, Comparative Example 5 prepared by solution polymerization exhibits excessively high reflection haze. From this result, it can be confirmed that a polymerization method, in addition to the surface modification of the silica nanopowder, also affects appearance characteristics.

The invention claimed is:

1. A method for preparing a copolymer, comprising:
adding a surface-modified silica nanopowder, a vinyl cyan-based monomer, and an aromatic vinyl-based monomer and polymerizing the same to form the copolymer having a weight-average molecular weight of 100,000-150,000 g/mol,
wherein the surface-modified silica nanopowder is a silica nanopowder which is surface-modified with a chain transfer agent for reversible addition-fragmentation chain transfer polymerization,
wherein the silica nanopowder is a hydrophilic fumed silica.

2. The method of claim 1, wherein the chain transfer agent for reversible addition-fragmentation chain transfer polymerization is one or more sulfur compounds selected from the group consisting of 4-cyano-4-(phenylcarbonothioylthio) pentanoic acid, 4-cyano-4-[(dodecylsulfanylthiocarbonyl)sulfanyl]pentanoic acid, and 2-(dodecylthiocarbonothioyl-thio)-2-methylpropionic acid.

3. The method of claim 1, wherein the silica nanopowder further comprises a hydroxyl group.

4. The method of claim 1, wherein the silica nanopowder has an average particle diameter of 1 to 100 nm.

5. The method of claim 1, wherein the silica nanopowder has an average particle diameter of 5 to 50 nm.

6. The method of claim 1, wherein the surface-modified silica nanopowder is added in an amount of 0.01 to 2 parts by weight based on 100 parts by weight of the sum of the vinyl cyan-based monomer and the aromatic vinyl-based monomer.

7. The method of claim 1, wherein the surface-modified silica nanopowder is added in an amount of 0.1 to 1 part by weight based on 100 parts by weight of the sum of the vinyl cyan-based monomer and the aromatic vinyl-based monomer.

8. The method of claim 1, wherein the polymerization is suspension polymerization.

9. The method of claim 1, wherein the polymerization is performed by adding the surface-modified silica nanopowder, the vinyl cyan-based monomer, the aromatic vinyl-based monomer, an initiator, and a suspension stabilizer to water and stirring, and the polymerization is performed at 70 to 90° C.

10. The method of claim 9, wherein the weight-average molecular weight of the copolymer is 110,000 to 130,000 g/mol.

11. A method for preparing a copolymer, comprising:
adding a surface-modified silica nanopowder, a vinyl cyan-based monomer, and an aromatic vinyl-based monomer and polymerizing the same to form the copolymer having a weight-average molecular weight of 100,000-150,000 g/mol,
wherein the surface-modified silica nanopowder is a silica nanopowder which is surface-modified with a chain transfer agent for reversible addition-fragmentation chain transfer polymerization,
wherein the polymerization is performed by adding the surface-modified silica nanopowder, the vinyl cyan-based monomer, the aromatic vinyl-based monomer, an initiator, and a suspension stabilizer to water and stirring, and the polymerization is performed at 70 to 90° C.

\* \* \* \* \*